United States Patent
Horio et al.

(10) Patent No.: US 6,391,956 B1
(45) Date of Patent: May 21, 2002

(54) POLYOXYMETHYLENE RESIN COMPOSITION

(75) Inventors: Mitsuhiro Horio; Yuuji Yoshinaga, both of Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/508,601

(22) PCT Filed: Feb. 22, 1999

(86) PCT No.: PCT/JP99/00757

§ 371 Date: Mar. 14, 2000

§ 102(e) Date: Mar. 14, 2000

(87) PCT Pub. No.: WO99/43751

PCT Pub. Date: Sep. 2, 1999

(30) Foreign Application Priority Data

Feb. 24, 1998 (JP) .............................. 10-042020

(51) Int. Cl.⁷ ................................ C08K 5/11
(52) U.S. Cl. ...................... 524/314; 524/315; 524/377; 524/442
(58) Field of Search ................ 524/442, 314, 524/315, 377

(56) References Cited

U.S. PATENT DOCUMENTS

| | | |
|---|---|---|
| 4,645,785 A | 2/1987 | Heinz et al. |
| 4,987,176 A | 1/1991 | Goerrissen et al. |
| 5,036,120 A * | 7/1991 | Orikasa ...................... 523/436 |
| 5,173,532 A | 12/1992 | Endo et al. |
| 5,314,912 A * | 5/1994 | Yashitani .................... 524/458 |
| 5,346,737 A | 9/1994 | Takahashi et al. |
| 5,432,216 A | 7/1995 | Yu et al. |
| 5,478,895 A * | 12/1995 | Sugiyama .................... 525/398 |
| 5,852,135 A | 12/1998 | Kanai et al. |

FOREIGN PATENT DOCUMENTS

| | | |
|---|---|---|
| EP | 0522180 A1 | 1/1993 |
| JP | 61-120848 A | 6/1986 |
| JP | 6443555 | 2/1989 |
| JP | 3111446 | 5/1991 |
| JP | 4-252232 A | 9/1992 |
| JP | 7-26112 A | 1/1995 |
| JP | 7-502768 A | 3/1995 |
| JP | 9-95594 A | 10/1995 |
| JP | 7-11101 A | 4/1997 |
| JP | 9-132694 A | 5/1997 |
| JP | 9-286897 A | 11/1997 |
| JP | 9-286899 A | 11/1997 |
| JP | 9286900 | 11/1997 |
| JP | 10-237268 A | 9/1998 |

* cited by examiner

*Primary Examiner*—Paul R. Michl
(74) *Attorney, Agent, or Firm*—Birch, Stewart, Kolasch & Birch, LLP

(57) ABSTRACT

A polyoxymethylene resin composition comprising:
(A) 50 to 99 parts by weight of a polyoxymethylene resin;
(B) 1 to 50 parts by weight of a wollastonite having a volume-average particle diameter of 0.5 to 40 μm;
(C) 0.1 to 10 parts by weight of at least one member selected from the group consisting of an ester of an alcohol and a fatty acid, an ester of an alcohol and a dicarboxylic acid, and a compound of a polyoxyalkylene glycol based on 100 parts by weight of the total amount of Component (A) and Component (B); and
(D) 0.1 to 10 parts by weight of a polyolefin resin based on 100 parts by weight of the total amount of Component (A) and Component (B).

The composition of the present invention provides a molded product which is excellent in resistance to friction and wearing, has high stiffness, repeated impact strength, and small molding strain, and is excellent in gear precision as compared with conventional compositions. Therefore, the polyoxymethylene resin composition of the present invention can be provided as a new material for the electrical and electronic parts, down-sizing of which has been progressing.

18 Claims, No Drawings

POLYOXYMETHYLENE RESIN COMPOSITION

This application is the national phase under 35 U.S.C. § 371 of PCT International Application No. PCT/JP99/00757 which has an International filing date of Feb. 22, 1999, which designated the United States of America.

TECHNICAL FIELD

The present invention relates to a polyoxymethylene resin composition and the molded product thereof, which exhibits excellent resistance to friction and wearing, high stiffness, high repeated impact strength, and small molding strain, and is excellent in gear precision.

BACKGROUND ART

A polyoxymethylene resin has been widely used as an engineering resin having well-balanced mechanical properties and excellent moldability in fields such as automobile parts, electrical and electronic products, etc. In the field of electrical and electronic products, downsizing and lightening of products have been recently proceeding. As a result, the polyoxymethylene resin is required, not only for further improvement in stiffness and resistance to friction and wearing, but also for improvement in impact strength, molding strain and gear precision.

For the purpose of improving stiffness and resistance to friction and wearing, techniques of incorporating an inorganic filler, a lubricant and the like with a polyoxymethylene resin have been proposed. Japanese Patent Publication Unexamined No. 1-263145 (corresponding to U.S. Pat. No. 5,106,896) discloses a technique of adding inorganic powder having a mean particle diameter of 100 μm or less and an ester of mono- or poly-valent alcohol and fatty acid to a polyacetal resin. Japanese Patent Publication Unexamined No. 3-111446 (corresponding to U.S. Pat. No. 5,173,532) discloses a resin composition obtainable by incorporating with a polyacetal resin a graft copolymer wherein an olefin polymer and a vinyl or ether polymer are chemically bonded in a branch or cross-linking structure, a lubricant, and inorganic powder having a mean particle diameter of 100 μm or less. These prior art documents do not exemplify, as the inorganic filler, wollastonite which is one of the components of the present invention; therefore, they are totally insufficient in improvement of stiffness and resistance to friction and wearing. Japanese Patent Publication Unexamined No. 5-51514 discloses a technique of adding spindle-shaped calcium carbonate and an ester of mono- or poly-valent alcohol and fatty acid to a polyacetal resin, but this is also insufficient in improving stiffness and resistance to friction and wearing. Japanese Patent Publication Unexamined No. 7-157630 discloses a composition comprising a graft or block copolymer obtained from olefin polymers and at least one of vinyl polymers, fatty ester, inorganic powder having a mean particle diameter of 30 μm or less and potassium titanate whisker, and a polyacetal resin. The composition disclosed therein is sufficient in improving stiffness, but is still insufficient in improving resistance to friction and wearing. Further, it has a drawback that molding strain (warpage of a molded product) is large.

On the other hand, techniques using wollastonite for a polyoxymethylene resin are described in Japanese Patent Publication Unexamined No. 49-21451 (corresponding to U.S. Pat. No. 3,775,363) which discloses an intimate mixture comprising 98 to 25 parts by weight of a polyoxymethylene resin and 2 to 75 parts by weight of needle-like calcium metasilicate without using a coupling agent. This composition is improved in processability, thermal stability and dimensional accuracy compared with the case using a glass fiber. Japanese Patent Publication Unexamined No. 61-120848 (corresponding to U.S. Pat. No. 4,645,785) discloses a composition having high resistance to wearing comprising 40 to 94.7 parts by weight of a polyoxymethylene, 5 to 50 parts by weight of wollastonite, 0.2 to 5 parts by weight of N-hydroxymethylmelamine, 0.1 to 5 parts by weight of silicone oil having a polymerization degree of 10 to 5,000, 0.1 to 10 parts by weight of polyethylene or a copolymer of ethylene and α-olefin having a molecular weight of 100,000 to 1,000,000. It is observed that this composition is improved in resistance to friction and wearing with metals, but the resistance to friction and wearing with a polyoxymethylene resin or the same composition, which is to be necessary for practical use, is considerably insufficient. Japanese Patent Publication Unexamined No. 64-43555 (corresponding to U.S. Pat. No. 4,987,176) discloses a composition containing polyoxymethylene polymers, wollastonite having a mean thickness of 5 μm or less and a mean length/thickness ratio of 5 or more, and if necessary additives, and a production method thereof. Further, this prior art specifically discloses, as additives, melamines such as N-hydroxymethylmelamine, silicone oil having a polymerization degree n of 10 to 5,000 and a polyethylene and/or a copolymer of ethylene and α-olefin having a molecular weight of 100,000 to 1,000,000, and this prior art further discloses as more preferable additives, stabilizers, nucleating agents, antistatic agents, light stabilizers, flame-retardants, lubricants, plasticizers, pigments, dyes, thermal stabilizers, and mold release agents. However, this prior art does not teach specific examples of lubricants. The composition disclosed in this prior art purposes improving mechanical strength.

DESCRIPTION OF THE INVENTION

The present inventors have made studies about adding various inorganic fillers, lubricants and other resin components to a polyoxymethylene resin. As a result, they accomplished the present invention by finding a composition which comprises (A) a polyoxymethylene resin, (B) wollastonite, (C) at least one member selected from the group consisting of an ester of (i) an alcohol and a fatty acid, (ii) an ester of an alcohol and a dicarboxylic acid, and (iii) a compound of a polyoxyalkylene glycol, and (D) a polyolefin resin, whereby said composition exhibits excellent resistance to friction and wearing, high stiffness, high repeated impact strength, and small molding strain, and is excellent in gear precision.

Accordingly, the present invention relates to a polyoxymethylene resin composition comprising:

(A) 50 to 99 parts by weight of a polyoxymethylene resin;

(B) 1 to 50 parts by weight of a wollastonite having a volume-average particle diameter of 0.5 to 40 μm;

(C) 0.1 to 10 parts by weight of at least one member selected from the group consisting of (i) an ester of an alcohol and a fatty acid, (ii) an ester of an alcohol and a dicarboxylic acid, and (iii) a compound of a polyoxyalkylene glycol based on 100 parts by weight of the total amount of Component (A) and Component (B); and (D) 0.1 to 10 parts by weight of a polyolefin resin based on 100 parts by weight of the total amount of Component (A) and Component (B).

Further, the present invention relates to a molded product prepared by molding the above composition, particularly working parts such as a gear, a cam, a slider, a lever, an arm, a clutch, a joint, an axis, a bearing, a key-stem and a key-top, outsert resinous parts for a chassis, a chassis, a tray and a side plate, which are used for office automation apparatuses represented by a printer and a copying machine; for video apparatuses represented by a video tape recorder (VTR) and a video movie (a video camera); for apparatuses for music, image, or information represented by a cassette player, a laser disc (LD), a mini disc (MD), a compact disc (CD) [including CD-ROM (read only memory), CD-R (recordable) and CD-RW (rewritable)], a digital video disc (DVD) [including DVD-ROM, DVD-R, DVD-RAM (random access memory) and DVD-Audio], a navigation system and a mobile personal computer; for telecommunication apparatuses represented by a cellular phone and a facsimile machine; for an interior or exterior working part for an automobile; and for industrial miscellaneous goods represented by a disposable camera, a toy, a fastener, a conveyor, a buckle, and an apparatus for house-building.

BEST MODE FOR CARRYING OUT THE INVENTION

The polyoxymethylene resins used for Component (A) of the present invention are homopolymers prepared by polymerizing formaldehyde or a cyclic oligomer thereof such as trioxane, a trimer of formaldehyde, and tetraoxane, a tetramer of formaldehyde, and by blocking terminals of the polymer with an ether group or an ester group; copolymers prepared by copolymerizing formaldehyde, its trimer of trioxane or its tetramer of tetraoxane with comonomers such as ethylene oxide, propylene oxide, 1,3-dioxolan and 1,4-butanediol formal; copolymers thereof which further have branched molecular chains; polyoxymethylene block copolymers, of which one terminal is blocked with different type of components such as polyethylene glycol; and the like.

The polyoxymethylene resins used in the present invention has a melt index (MI) (measured under the conditions prescribed by ASTM-D 1238-57T) of 0.1 g/10 min to 150 g/10 min, preferably 1 g/10 min to 100 g/10 min. The copolymer type polyoxymethylene contains the comonomers in an amount of 0.1 to 20 mol, preferably 0.3 to 10 mol, based on 100 mol of oxymethylene.

The polyoxymethylene resin of the present invention can contain a heat stabilizer, a weathering (light) stabilizer or a combination of these stabilizers for use. Of course, the polyoxymethylene resin can be preliminarily stabilized with these stabilizers.

As the heat stabilizer, an antioxidant and a catching agent of formaldehyde or formic acid are preferable. A combination of these heat stabilizers is also effective. As the antioxidants, a hindered phenol type antioxidant is preferable. For example, the hindered phenol type antioxidant includes n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphdnyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethylene glycol-bis-(3-(3-t-butyl-S-methyl-4-hydroxyphenyl)-propionate), tetrakis-(methylene-3-(3',5'-di-t-butyl-4'-hydroxyphenyl)propionatemethane, 3,9-bis(2-(3-(3-t-butyl-4-hydroxy-5-methylphenyl)propionyloxy)-1,1-dimethylethyl)2,4,8,10-tetraoxaspiro(5,5)undecane, N,N'-bis-3-(3',5'-di-t-butyl-4-hydroxyphenol) propionylhexamethylenediamine, N,N'-tetramethylenebis-3-(3'-methyl-5'-t-butyl-4-hydroxyphenol)propionyldiamine, N,N'-bis-(3-(3,5-di-t-butyl-4-hydroxyphenol)propionyl) hydrazine, N-salicyloyl-N'-salicylidene hydrazine, 3-(N-salicyloyl)amino-1,2,4-triazol, N,N'-bis(2-(3-(3,5-di-butyl-4-hydroxyphenyl)propionyloxy)ethyl)oxyamido, and the like. Of these hindered phenol type antioxidants, triethylene glycol-bis-(3-(3-t-butyl-5-methyl-4-hydroxyphenyl)-propionate), tetrakis-(methylene-3-(3',5'-di-t-butyl-4'-hydroxyphenyl)propionatemethane are preferable.

As the catching agents of formaldehyde and formic acid, there can be exemplified (a) compounds and polymers containing formaldehyde-reactive nitrogen, (b) a hydroxide, an inorganic acid salt, a carboxylic acid salt or an alkoxide, and the like of an alkali metal or an alkali earth metal.

As (a) the compounds containing formaldehyde-reactive nitrogen, there can be exemplified (1) dicyan diamide, (2) an amino-substituted triazine, (3) a co-condensation product of an amino-substituted triazine and formaldehyde, and the like. (2) an amino-substituted triazine includes, for instance, guanamine(2,4-diamino-sym-triazine), melamine(2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine(2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N',N'-tetracyanoethylbenzoguanamine, and the like. (3) a co-condensation product of an amino-substituted triazine and formaldehyde includes, for instance, a melamine-formaldehyde polycondensation product, and the like. Of these, dicyan diamide, melamine and a melamine-formaldehyde polycondensation product are preferable.

Further, as (a) the polymer containing a formaldehyde-reactive nitrogen group, there can be exemplified (1) a polyamide resin, (2) a polymer obtained by polymerizing acrylamide and/or a derivative thereof, or acrylamide and/or a derivative thereof and other vinyl monomers in the presence of metal alcolate, (3) a polymer obtained by polymerizing acrylamide and/or a derivative thereof, or acrylamide and/or a derivative thereof and other vinyl monomers in the presence of a radical polymerization initiator, and (4) a polymer containing nitrogen-containing groups such as an amine, an amide, urea and urethane. As (1) a polyamide resin, there can be exemplified nylon 4-6, nylon 6, nylon 6-6, nylon 6-10, nylon 6-12, nylon 12 and copolymers thereof such as nylon 6/6-6, nylon 6/6-6/6-10 and nylon 6/6-12. As (2) a polymer obtained by polymerizing acrylamide and/or a derivative thereof, or acrylamide and/or a derivative thereof and other vinyl monomers in the presence of metal alcolate, a poly-β-alanine copolymer can be exemplified. These polymers can be prepared according to the methods disclosed in Japanese Patent Publication Examined No. 6-10259 (corresponding to U.S. Pat. No. 5,015,707), Japanese Patent Publication Examined No. 5-87096, Japanese Patent Publication Examined No. 5-47568 and Japanese Patent Publication Unexamined No. 3-234729. (3) a polymer obtained by polymerizing acrylamide and/or a derivative thereof, or acrylamide and/or a derivative thereof and other vinyl monomers in the presence of a radical polymerization initiator can be prepared according to the method disclosed in Japanese Patent Publication Unexamined No. 3-28260 (corresponding to U.S. Pat. No. 5,011,890).

(b) The hydroxide, the inorganic acid salt, the carboxylic acid salt or the alkoxide of an alkali metal or an alkali earth metal includes, for instance, hydroxide of such as sodium, potassium, magnesium, calcium and barium, and carbonate, phosphate, silicate, borate and carboxylate of the above metals. The carboxylic acid of the carboxylate is saturated or unsaturated aliphatic carboxylic acids having 10 to 36 carbon atoms, and the like. And, these carboxylic acids may be substituted with hydroxyl groups. As the saturated aliphatic carboxylic acids, a capric acid, a lauric acid, a myristic acid, a palmitic acid, a stearic acid, an arachic acid, a behenic acid, a lignoceric acid, a cerotic acid, a montanoic acid, a melissic acid and a lacceric acid can be exemplified. As the unsaturated aliphatic carboxylic acids, an undecylenic acid, an oleic acid, an elaidic acid, cetoleic acid, an erucic, acid, a brassidic acid, a sorbic acid, a linoleic acid, a linolenic acid, an arachidonic acid, a propiolic acid, a stearolic acid and the like can be exemplified. Further, as an alkoxide, a methoxide, an ethoxide and the like of the above-exemplified metals can be illustrated as examples.

As the weathering (light) stabilizers, (a) benzotriazole type substances, (b) anilide oxalate type substances and (c) hindered amine type substances are preferable. As (a) the benzotriazole type substances, there can be exemplified, for instance, 2-(2'-hydroxy-5'-methyl-phenyl)benzotriazole, 2-(2'-hydroxy-3,5-di-t-butyl-phenyl)benzotriazole, 2-(2'-hydroxy-3,5-di-t-amyl-phenyl)benzotriazole, 2-[2'-hydroxy-3,5-bis-(α,α-dimethylbenzyl)phenyl]-2H-benzotriazole, 2-(2'-hydroxy-5'-octylphenyl)benzotriazole, and the like. Of these, 2-[2'-hydroxy-3,5-bis-(α,α-dimethylbenzyl)phenyl]-2H-benzotriazole and 2-(2'-hydroxy-3,5-di-t-butyl-phenyl)benzotriazole are preferable.

As (b) the anilide oxalate type substances, there can be exemplified, for instance, 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, and the like. These substances may be used alone or in combination.

As (c) the hindered amine type substances, there can be exemplified 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis( 2,2,6,6-teteramethyl-4-piperidine)-carbonate, bis(2,2,6,6-tetramethyl-4-piperidyl)-oxalate, bis(2,2,6,6-tetramethyl-4-piperidyl)-malonate, bis (2,2,6,6-teteramethyl-4-piperidyl)-sebacate, bis(2,2,6,6-teteramethyl-4-piperidyl)-adipate, bis(2,2,6,6-teteramethyl-4-piperidyl)-terephthalate, 1,2-bis(2,2,6,6-teteramethyl-4-piperidyloxy)-ethane, α-α'-bis(2,2,6,6-teteramethyl-4-piperidyloxy)-p-xylene, bis(2,2,6,6-teteramethyl-4-piperidyl)tolylene-2,4-dicarbamate, bis(2,2,6,6-teteramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate and the like, preferably bis(2,2,6,6-tetramethyl-4-piperidyl)-sebacate. These hindered amine type substances may be used individually or in combination. Further, the combination of at least one of the benzotriazole type substances and the anilide oxalate type substances with the hindered amine type substances is most preferable.

The wollastonite used for Component (B) of the present invention is prepared by generally pulverizing wollastonite existing in the nature or synthetic wollastonite. In this pulverizing process, wollastonite in the shape of a long thin needle and a particle (including a short stick and a granule) is obtained. These wollastonites may be in the shape of a needle or a particle, or in combination of these shapes. The particle diameter is in the range of 0.5 to 40 μm, preferably 1 to 30 μm, in a volume-average particle diameter. The particle diameter of over 40 μm unfavorably causes deterioration of surface appearance and sliding property of the resin. The particle diameter of less than 0.5 μm unfavorably causes deterioration of processability since the improvement effect of stiffness is reduced and the viscosity at melting is increased.

The granular wollastonite has an aspect ratio of preferably 2 to 7, more preferably 3 to 5. When the aspect ratio is lower than 2, the stiffness is not improved effectively. When it is higher than 7, the warpage is apt to become large. The needle-like wollastonite has an aspect ratio of preferably 10 to 30, more preferably 10 to 25. When an aspect ratio is lower than 10, the stiffness is not improved effectively. When it is higher than 30, the warpage is apt to become large.

Either wollastonite with a treated surface or with an untreated surface may be used. As the surface treatment agents, conventionally known ones can be used; for instance, various types of coupling agents such as silane type, titanate type, aluminum type and zirconium type can be used. Specifically, the useful coupling agents include N-(2-aminoethyl)-3-aminopropyl triethoxysilane, 3-glycidoxypropyl trimethoxysilane, isopropyl trisstealoyl titanate, diisopropoxy ammonium ethylacetate, n-butylzirconate, and the like.

The wollastonite is added in an amount of 1 to 50 parts by weight, preferably 2 to 40 parts by weight, more preferably 5 to 30 parts by weight, based on 100 parts by weight of the resin comprising the polyoxymethylene type resin and the wollastonite. When it is less than 1 part by weight, the reinforcing effect of the filler is not exhibited sufficiently. When it is more than 50 parts by weight, not only the deterioration in the surface appearance but also reduction in molding processability and impact strength are unfavorably caused.

The ester of an alcohol and a fatty acid, the ester of an alcohol and a dicarboxylic acid and the polyoxyalkylene glycol compound used as Component (C) of the present invention are as follows.

The ester of an alcohol and a fatty acid includes esters of an alcohol and a fatty acid listed below.

The alcohol includes a monovalent alcohol and a polyvalent alcohol. The monovalent alcohol includes, for instance, saturated or unsaturated alcohol such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, and decylstearyl alcohol.

The polyvalent alcohol includes, for instance, ethylene glycol, diethylene glycol, triethylene glycol, propylene glycol, dipropylene glycol, butane diol, pentane diol, hexane diol, glycerin, diglycerin, triglycerin, pentaerythritol, arabitol, ribitol, xylitol, sorbite, sorbitan, sorbitol, mannitol, and the like.

The fatty acid includes caproic acid, enanthic acid, caprylic acid, pelargonic acid, capric acid, undecyl acid, lauric acid, tridecyl acid, myristic acid, pentadecyl acid, palmitic acid, pentadecyl acid, stearic acid, nanodecanoic acid, arachic acid, behenic acid, lignoceric acid, cerotic acid, heptacosanoic acid, montanoic acid, melissic acid, lacceric acid, undecylenic acid, oleic acid, elaidic acid, cetoleic acid, erucic acid, brassidic acid, sorbic acid, linoleic acid, linolenic acid, arachidonic acid, propiolic acid, stearolic acid, and the like. Further, the fatty acid includes natural fatty acids containing the above-listed components or a mixture thereof. These fatty acids may be substituted with a hydroxy group. Among the above-listed esters of an alcohol and a fatty acid, an ester of an alcohol and a fatty acid independently having a carbon number of 10 or more is preferable from the viewpoint of improvement in resistance to friction and wearing; an ester of a fatty acid having a carbon number of 12 or more and an alcohol having a carbon number of 10 or more is more preferable; and an ester of a fatty acid having a carbon number of 12 to 30 and an alcohol having a carbon number of 10 to 20 is more preferable.

The ester of an alcohol and a dicarboxylic acid includes the monoester and diester of a saturated or unsaturated primary alcohol such as octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol and decylstearyl alcohol and a dicarboxylic acid such as oxalic acid, malonic acid, succinic acid, glutaric acid, adipic acid, pimelic acid, suberic acid, azelaic acid, sebacic acid, maleic acid and fumaric acid, and a mixture thereof.

Of these esters of an alcohol and a dicarboxylic acid, an acid of an alcohol and a dicarboxylic acid having independently a carbon number of 10 or more is preferable.

As the polyoxymethylene glycol compound, three types of the compound are exemplified. A first group of the compound includes a polycondensation product containing an alkylene glycol as a monomer, for example, a polyethylene glycol, a polypropylene glycol and a block polymer of ethylene glycol and propylene glycol. The polymerization degree of these compounds is preferably 5 to 1,000, more preferably 10 to 500. A second group is an etherified compound of the first group of compounds and an aliphatic alcohol, for example, polyethylene glycol oleyl ether (ethyleneoxide polymerization degree: 5 to 50), polyethylene glycol cetyl ether (ethyleneoxide polymerization degree: 5 to 50), polyethylene glycol stearyl ether (ethyleneoxide polymerization degree: 5 to 30), polyethylene glycol lauryl ether (ethyleneoxide polymerization degree: 5 to 30), polyethylene glycol tridecyl ether (ethyleneoxide polymerization degree: 5 to 30), polyethylene glycol nonylphenyl ether (ethyleneoxide polymerization degree: 2 to 100), polyethylene glycol octylphenyl ether (ethyleneoxide polymerization degree: 4 to 50), and the like. A third group of compounds is an etherified compound of the first group of compounds and a higher fatty acid, for example, polyethylene glycol monolaurate (ethyleneoxide polymerization degree: 2 to 30), polyethylene glycol monostearate (ethyleneoxide polymerization degree: 2 to 50), polyethylene glycol monooleate (ethyleneoxide polymerization degree: 2 to 50), and the like.

Among the above-listed Component (C), an ester of an alcohol and a fatty acid and an ester of an alcohol and a dicarboxylic acid are preferably used in view of resistance to friction and wearing.

These esters of lubricants are contained in an amount of 0.1 to 10 parts by weight, preferably 0.2 to 5 parts by weight, based on the total amount of 100 parts by weight of (A) the polyoxymethylene resin and (B) the wollastonite. If the addition amount of the lubricants is less than 0.1 part by weight, the improvement in the sliding properties unfavorably becomes insufficient. If it is more than 10 parts by weight, the reduction of mechanical properties becomes unfavorably remarkable.

The polyolefin resin used for Component (D) of the present invention is a homopolymer, a copolymer of an unsaturated olefinic compound represented by the general formula (1) or a modified product thereof:

(1)

wherein $R_1$ represents a hydrogen atom or a methyl group; and $R_2$ represents a hydrogen atom, an alkyl group or a carboxyl group, having a carbon number of 1 to 10, an alkylated carboxyl group having a carbon number of 2 to 5, an acyloxyl group having a carbon number of 2 to 5, or a vinyl group.

Specifically, a polyethylene (a high-density polyethylene, a medium-density polyethylene, a high-pressure low-density polyethylene, a linear low-density polyethylene and an ultra-low-density polyethylene), a polypropylene, an ethylene-propylene copolymer, an ethylene-butene copolymer, a polypropylene-butene copolymer, a polybutene, a hydrogenated product of a polybutadiene, an ethylene-acrylic ester copolymer, an ethylene-methacrylic ester copolymer, an ethylene-acrylic acid copolymer, an ethylene-vinyl acetate copolymer, and the like are exemplified. As modified products thereof, graft copolymers prepared by grafting one or more other vinyl compounds can be exemplified.

Of these, a polyethylene (a high-pressure low-density polyethylene, a linear low-density polyethylene and an ultra-low-density polyethylene), an ethylene-propylene copolymer, and an ethylene-butene copolymer are preferable. A weight-average molecular weight of these polyolefin type resins is not particularly restricted, but preferably 10,000 to 300,000, more preferably 10,000 to 100,000, further more preferably 15,000 to 80,000. When the weight-average molecular weight is lower than 10,000, the resistance to friction and wearing with the same material as of the present invention are caused to be unfavorably deteriorated. When it is higher than 300,000, the resistance to friction and wearing with the polyoxymethylene resin are caused to be unfavorably deteriorated.

The polyolefin polymer is added in an amount of 0.1 to 10 parts by weight, preferably 0.2 to 5 parts by weight, based on 100 parts by weight of a resin comprising (A) the polyoxymethylene resin and (B) the wollastonite. When the addition amount of the polyolefin polymer is 0.1 or less, the improvement of the sliding properties unfavorably becomes insufficient. When it is more than 10 parts by weight, the molded product is unfavorably peeled off.

For the polyoxymethylene resin composition of the present invention, there can be employed crystalline nucleating agents, antistatic agents, mold release agents, inorganic fillers other than wollastonite and pigments, which are not described in the present specification but have been conventionally and widely used for the polyoxymethylene resins.

The pigments include inorganic and organic ones. The inorganic pigments mean those commonly used for coloring resins, for example, they include zinc sulfide, zinc oxide, titanium oxide, barium sulfate, titan yellow, iron oxide, ultramarine, cobalt blue, a carbonate, a phosphate, an acetate, carbon black, acetylene black, lamp black, and the like. The organic pigments include pigments in the types of, for example, azo, isoindolin, disazo, monoazo, anthraquinone, heterocyclic, perinone, quinacridone, thioindigo, perylene, dioxazine, phthalocyanine, and the like.

Melt kneading methods of the polyoxymethylene resin composition of the present invention are not particularly limited. Generally, the resin composition is melt kneaded with a monoaxial extruder or a biaxial extruder. At this time, a processing temperature is preferably 180 to 240° C. Further, the ways of feeding each component upon the extrusion are not particularly limited. For instance, the components may be fed according to the methods: (1) mixing the polyoxymethylene resin, a wollastonite, a lubricant and a polyolefin resin all at once and feeding the mixture from the main feeder of an extruder to melt knead; (2) feeding the polyoxymethylene resin and an additive from the main feeder of an extruder and then feeding a wollastonite to a molten resin from a side feeder provided at the middle of the extruder to melt knead; (3) feeding and kneading an additive agent after the polyoxymethylene resin and wollastonite are melt kneaded; or the like.

EXAMPLES

Hereinafter, the present invention is illustrated in detail referring to Examples. First of all, components and evaluation methods employed in Examples and Comparative Examples are described below.

Description of Component Used

A. Polyoxymethylene Resin

A-1: Polyoxymethylene copolymer containing 4 mol % of ethylene oxide as a comonomer and having a melt index of 30 g/10 min (ASTM D-1238-57T) [further containing 0.4% by weight of triethylene glycol-bis-(3-(3-t-butyl-5-methyl-4-hydroxyphenyl)-propionate), 0.1% by weight of melamine and 0.05% by weight of nylon 6,6 as a stabilizer].

A-2: Polyoxymethylene homopolymer having a melt index of 30 g/10 min (ASTM D-1238-57T) [further containing 0.4% by weight of triethylene glycol-bis-(3-(3-t-butyl-5-methyl-4-hydroxyphenyl)-propionate) and 0.5% by weight of poly-β-alanine having a volume-average particle diameter of 2.5 μm as a stabilizer].

A-3: Block copolymer of polyoxymethylene homopolymer and polyethylene glycol having a melt index of 30 g/10 min (ASTM D-1238-57T) [further containing 0.4% by weight of triethylene glycol-bis-(3-(3-t-butyl-5-methyl-4-hydroxyphenyl)-propionate) and 0.5% by weight of poly-β-alanine having a volume-average particle diameter of 2.5 μm as a stabilizer].

A-4: Polyoxymethylene copolymer containing 2 mol % of 1,3-dioxolan as a comonomer and having a melt index of 30 g/10 min (ASTM D-1238-57T) [further containing 0.4% by weight of triethylene glycol-bis-(3-(3-t-butyl-5-methyl-4-hydroxyphenyl)-propionate), 0.4% by weight of melamine and 0.05 % by weight of nylon 6,6 as a stabilizer].

B. Wollastonite and Others

B-1: Needle-like wollastonite having a volume-average particle diameter of 6 μm measured with a laser particle diameter measuring device, and a shorter diameter of 2 μm and a longer diameter of 40 μm measured with a scanning electron microscope.

B-2: Needle-like wollastonite having a volume-average particle diameter of 15 μm measured with a laser particle diameter measuring device, and a shorter diameter of 4.5 μm and a longer diameter of 50 μm measured with a scanning electron microscope.

B-3: Granular wollastonite having a volume-average particle diameter of 3 μm measured with a laser particle diameter measuring device and having an aspect ratio of 3.

B-4: Granular wollastonite having a volume-average particle diameter of 10 μm measured with a laser particle diameter measuring device and having an aspect ratio of 5.

B-5: Granular wollastonite having a volume-average particle diameter of 20 μm measured with a laser particle diameter measuring device and having an aspect ratio of 5.

B-6: Granular wollastonite having a volume-average particle diameter of 50 μm measured with a laser particle diameter measuring device and having an aspect ratio of 5.

B-7: Granular talc having a volume-average particle diameter of 6 μm measured with a laser particle diameter measuring device and having an aspect ratio of 5.

B-8: Granular calcium carbonate having a volume-average particle diameter of 3 μm measured with a laser particle diameter measuring device and having an aspect ratio of 3.

B-9: Potassium titanate whisker having a shorter diameter of 0.15 μm and a longer diameter of 20 μm measured with a scanning electron microscope.

C. Lubricant (Ester of Alcohol and Fatty Acid, etc.)

C-1: Cetyl myristate
C-2: Stearyl stearate
C-3: Adipic acid dilaurate
C-4: Ethylene glycol distearate
C-5: Polyethylene glycol (polymerization degree=30)
C-6: Liquid ethylene-propylene copolymer (molar ratio of ethylene/propylene =50/50; polymerization degree n=55)

D. Polyolefin Resin

D-1: Ethylene-butene copolymer (MI=70 g/10 min; Mw=50,000)
D-2: Ethylene-butene copolymer (MI=18 g/10 min; Mw=70,000)
D-3: Ethylene-butene copolymer (MI=3.6 g/10 min; Mw=100,000)
D-4: Ethylene-butene copolymer (MI=0.3 g/10 min; Mw=190,000)
D-5: High-pressure low-density polyethylene (MI=45 g/10 min; Mw 49,000)
D-6: High-pressure low-density polyethylene (MI=0.4 g/10 min; Mw=280,000)
D-7: Ethylene-butene copolymer (MI=150 g/10 min; Mw=20,000)
D-8: High-pressure low-density polyethylene (MI=90 g/10 min; Mw=24,000)
D-9: High density polyethylene (MI=0.3 g/10 min; Mw=190,000)

Evaluation Method (1) Evaluation of Physical Properties
i) Melt Flow Rate (MI): Measured according to ASTM D-1238-57T
ii) Tensile Strength (TS) and Tensile Elongation (TE): Measured according to ASTM D638 iii) Flexural Strength (FS) and Flexural Modulus (FM): Measured according to ASTM D790
iv) Izod Impact Strength (Izod): Measured according to ASTM D256

(2) Repeated Impact Strength

In order to measure Izod impact strength, a specimen was prepared according to ASTM D256 and subjected to a repeated impact test under the conditions of a load of 160 g, a drop height of 20 mm and a drop rate of 35 drops/min to count a number until the specimen was broken using a repeated impact tester manufactured by Toyo Seiki Seisakusho Co., Ltd.

(3) Molding Strain

Pellets obtained in Examples and Comparative Examples were dried at 80° C. for three hours, and then molded into a plate having a size of 150 mm×150 mm and a thickness of 3 mm (wherein a 1 mm pin gate existed at each side of the plate, the position of which was on the center line of the plate and 20 mm away from the edge) under the conditions of a mold temperature of 70° C. and a cooling period of 30 seconds using a 5-ounce molding machine (IS-100E manufactured by Toshiba Machine Co., Ltd.) whose cylinder temperature was set at 200° C. The resultant plate was left for 2 days after molding, and then was placed on a flat desk. A weight was put on an edge without the pin gate of the plate so as for the other edge to rise from the surface of the desk. The height the edge rose was measured using a micrometer. The measured height was defined as follows:

⊚: 1 mm or less

○: more than 1 mm, and 2 mm or less

Δ: more than 2 mm, and 5 mm or less

X: more than 5 mm, and 10 mm or less

XX: more than 10 mm (4) Sliding Properties

Pellets obtained in Examples and Comparative Examples were dried at 80° C. for three hours, and then molded into a plate having a thickness of 3 mm under the conditions of a mold temperature of 70° C. and a cooling period of 20 seconds using a 1-ounce molding machine (TI-30G manufactured by Toyo Machinery and Metal Co., Ltd.) whose cylinder temperature was set at 200° C. to prepare a specimen. Using a reciprocating friction and wearing tester (AFT-15MS type manufactured by Tosoku Seimitsu Co., Ltd.), the friction coefficient and abrasion wear (maximum depth of wear) of the plate specimen were measured by reciprocating an SUS304 material (a ball with a 5 mm diameter) and polyacetal resin materials (cylinders with a 5 mm diameter and a tip R=2.5 mm which were molded respectively using Tenac® 4520 and the polyacetal resin composition of the present invention) 5,000 times on the surface of the plate specimen under the conditions of a load of 2 kg, a linear speed of 30 mm/sec, a reciprocating distance of 20 mm and an environmental temperature of 23° C.

(5) Intermeshing Test

A gear having a module of 1.0 mm, a tooth number of 30, a pressure angle of 20 degrees and a thickness of 5 mm was molded using a 1-ounce injection. molding machine, of which the cylinder temperature was set at 200° C., at a mold temperature of 80° C. Then, 1 pitch meshing error of both tooth flanks was measured according to Japan Gear Machinery Association Standard, JGMA 116-02.

Example 1

80 parts by weight of (A-1) polyoxymethylene copolymer, 20 parts by weight of (B-1) wollastonite, 2 parts by weight of (C-1) ester of alcohol and fatty acid and 2 parts by weight of (D-1) polyolefin resin were uniformly mixed using a Henschel mixer. The resultant mixture was fed to a 30 mm biaxial extruder having L/D=30 through a main feeding port, and kneaded at a screw rotation number of 100 rpm with an extrusion amount of 10 kg/hr. The extruded resin was cut into pellets using a strand cutter, and the resultant pellets were subjected to various evaluations. The results thereof are shown in Table 1.

Examples 2 to 5

The same procedure as in Example 1 was carried out except that (B1) employed in Example 1 was changed to (B-2) to (B-5) as shown in Table 1. The results thereof are shown in Table 1.

Comparative Examples 1 to 3

The same procedure as in Example 1 was carried out except that (B-1) employed in Example 1 was changed to (B-6) to (B-8) as shown in Table 1. The results thereof are shown in Table 1.

As is apparent from the comparison between Examples 3 to 5 and Comparative Example 1, the repeated impact strength and resistance to friction and wearing were deteriorated when the particle diameter of a wollastonite exceeded the range claimed in the present invention.

As is apparent from the comparison between Examples 3 to 5 and Comparative Example 2, the resin containing talc was inferior to those containing a granular wollastonite in molding strain, pitch meshing error of both tooth flanks, repeated impact strength and resistance to friction and wearing, though the stiffness was almost the same.

Further, as is apparent from the comparison between Examples 3 to 5 and Comparative Example 3, the resin containing calcium carbonate was inferior to those containing a granular wollastonite in stiffness, repeated impact strength and resistance to friction and wearing, though molding strain and pitch meshing error of both tooth flanks were almost same.

Comparative Examples 4 and 5

The same procedure as in Example 1 was carried out except that the amount of (A-1) employed in Example 1 was changed and (B-1) was changed to (B-9), an amount of which was further changed as shown in Table 1. The results thereof are shown in Table 1.

As is apparent from the comparison between Examples 1 and 2 and Comparative Examples 4 and 5, the resin containing potassium titanate whisker was inferior to that containing a needle-like wollastonite in molding strain, pitch meshing error of both tooth flanks, repeated impact strength and resistance to friction and wearing.

Comparative Example 6

The same procedure as in Example 1 was carried out except that (D-1) employed in Example 1 was not added. The results thereof are shown in Table 1.

As is apparent from the comparison with Example 1, when the polyolefin resin was not contained, the properties of resistance to friction and wearing with stainless steel were good, but those with a polyoxymethylene resin and with the same material as of the present invention were not improved.

Comparative Example 7

The same procedure as in Example 1 was carried out except that (C-1) employed in Example 1 was not added. The results thereof are shown in Table 1.

As is apparent from the comparison with Example 1, when a lubricant such as a fatty ester was not contained, the resistance to friction and wearing were not improved.

Comparative Example 8

The same procedure as in Example 1 was carried out except that (C-1) and (D-1) employed in Example 1 were not added. The results thereof are shown in Table 1.

As apparent from the comparison with Example 1, when a lubricant such as fatty ester and a polyolefin resin were not contained, the resistance to friction and wearing were considerably inferior.

Examples 6 to 13

The same procedure as in Example 1 was carried out except that (D-1) employed in Example 1 was changed to (D-2) to (D-9) as listed in Table 2. The results thereof are shown in Table 2.

Examples 14 to 17

The same procedure as in Example 3 was carried out except that (C-1) employed in Example 3 was changed to (C-2) to (C-5) as listed in Table 2. The results thereof are shown in Table 2.

Examples 18 and 19

The same procedure as in Example 1 was carried out except that (B-1) employed in Example 1 was changed to a mixture of (B-1) and (B-3) shown in Table 2. The results thereof are shown in Table 2.

Example 20

80 parts by weight of (A-2) polyoxymethylene homopolymer, 20 parts by weight of (B-1) wollastonite, 2 parts by weight of (C-1) ester of alcohol and fatty acid, 2 parts by weight of (D-2) polyolefin resin were uniformly mixed using a Henschel mixer. The resultant mixture was fed to a 30 mm biaxial extruder having L/D=30 and being set at 190° C. through its main feeding port, and kneaded at a screw rotation number of 100 rpm with an extrusion amount of 8 kg/hr. The extruded resin was cut into pellets using a strand cutter, and the resultant pellets were subjected to various evaluation. The results thereof are shown in Table 3.

Examples 21 and 22

The same procedure as in Example 20 was carried out except that (C-1) employed in Example 20 was changed to (C-3) or (C-5) as shown in Table 3. The results thereof are shown in Table 3.

Example 23

The same procedure as in Example 20 was carried out except that (B-1) employed in Example 20 was changed to (B-3) as shown in Table 3. The results thereof are shown in Table 3.

Example 24

The same procedure as in Example 21 was carried out except that (B-1) employed in Example 21 was changed to (B-3) as shown in Table 3. The results thereof are shown in Table 3.

Example 25

The same procedure as in Example 20 was carried out except that (A-2) employed in Example 20 was changed to (A-3). The results thereof are shown in Table 3.

Example 26

The same procedure as in Example 23 was carried out except that (A-2) employed in Example 23 was changed to (A-3). The results thereof are shown in Table 3.

Example 27

The same procedure as in Example 20 was carried out except that (A-2) employed in Example 20 was changed to a mixture of (A-2) and (A-3) and further Component (C-6) was added in an amount of 3 parts by weight. The results thereof are shown in Table 3.

Example 28

The same procedure as in Example 27 was carried out except that (B-1) employed in Example 27 was changed to (B-3). The results thereof are shown in Table 3.

Example 29

The same procedure as in Example 27 was carried out except that (B-1) employed in Example 27 was changed to a mixture of (B-1) and (B-3). The results thereof are shown in Table 3.

Example 30

80 parts by weight of (A-1) polyoxymethylene copolymer, 2 parts by weight of (C-1) and 2 parts by weight of (D-2) were uniformly mixed using a Henschel mixer. The resultant mixture was fed to a 30 mm biaxial extruder having L/D=30 and being set at 200° C. through its main feeding port, and 20 parts by weight of (B-1) wollastonite was fed from a side feeding port provided downstream of the main feeding port. Then, kneading was carried out at a screw rotation number of 100 rpm. The amount ratio of main feeding to side feeding was controlled according to each weight ratio and the final amount of extrudate was adjusted so as to be 8 kg/hr. The extruded resin was cut into pellets using a strand cutter. Using the resultant pellets, evaluation was carried out. The results thereof are shown in Table 3.

Example 31

The same procedure as in Example 30 was carried out except that (B-1) employed in Example 30 was changed to (B-3). The results thereof are shown in Table 3.

Example 32

80 parts by weight of (A-4) polyoxymethylene copolymer was fed from the main feeding port of a 60 mm biaxual extruder having L/D=40 and being set at 200° C. 10 parts by weight of (B-1) wollastonite was fed from a side feeding port-1 provided downstream of the main feeding port. Further, a mixture prepared by uniformly kneading 10 parts by weight of (A-4) polyoxymethylene copolymer, 2 parts by weight of (C-1) ester of alcohol and fatty acid and 2 parts by weight of (D-1) polyolefin using a Henschel mixer was fed from a side feeding port-2 provided downstream of the side feeding port-1. Then, kneading was carried out at a screw rotation number of 150 rpm. The amount ratio of main feeding to side feeding was controlled according to each weight ratio and the final amount of extrudate was adjusted so as to be 150 kg/hr. The screw was designed so as to arrange that the components added at the previous step were in a completely melted and uniformly mixed state at each of the side feeding ports. The extruded resin was cut thereafter into pellets with a strand cutter. Using the resultant pellets, evaluation was carried out. The results thereof are shown in Table 4.

Example 33

The same procedure as in Example 32 was carried out except. that the amount of (A-4) fed from the main feeding port was changed to 70 parts by weight and that of (B-1) fed from the side feeding port-1 was changed to 20 parts by weight. The results thereof are shown in Table 4.

Example 34

The same procedure as in Example 32 was carried out except that the amount of (A-4) fed from the main feeding port was changed to 60 parts by weight, that of (B-1) fed from the side feeding port-1 was changed to 30 parts by weight and that of (D-2) fed from the side feeding port-2 was changed to 3 parts by weight. The results thereof are shown in Table 4.

Example 35

The same procedure as in Example 33 was carried out except that (B-1) was changed to (B-3) and (C-1) was changed to (C-3). The results thereof are shown in Table 4.

Example 36

The same procedure as in Example 34 was carried out except that (B-1) was changed to (B-3) and (C-1) was changed to (C-3). The results thereof are shown in Table 4.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|
| Composition | | | | | | | | | | | | | |
| Polyoxymethylene resin (A-1) | 80 | 80 | 80 | 80 | 80 | 80 | 80 | 80 | 95 | 90 | 80 | 80 | 80 |
| Wollastonite, etc. | | | | | | | | | | | | | |
| (B-1) | 20 | | | | | | | | | | 20 | 20 | 20 |
| (B-2) | | 20 | | | | | | | | | | | |
| (B-3) | | | 20 | | | | | | | | | | |
| (B-4) | | | | 20 | | | | | | | | | |
| (B-5) | | | | | 20 | | | | | | | | |
| (B-6) | | | | | | 20 | | | | | | | |
| (B-7) | | | | | | | 20 | | | | | | |
| (B-8) | | | | | | | | 20 | | | | | |
| (B-9) | | | | | | | | | 5 | 10 | | | |
| Aliphatic ester, etc. (C-1) | 2 | 2 | 2 | 2 | 2 | 2 | 2 | 2 | 2 | 2 | 2 | 0 | 0 |
| Polyoefin resin (D-1) | 2 | 2 | 2 | 2 | 2 | 2 | 2 | 2 | 2 | 2 | 0 | 2 | 0 |
| Result | | | | | | | | | | | | | |
| Physical Property | | | | | | | | | | | | | |
| MI (g/10 min) | 25 | 25 | 24 | 25 | 27 | 29 | 28 | 24 | 22 | 22 | 25 | 23 | 20 |
| TS (kg/cm$^2$) | 540 | 540 | 510 | 520 | 520 | 520 | 520 | 480 | 520 | 590 | 530 | 640 | 690 |
| TE (%) | 6 | 7 | 7 | 6 | 6 | 6 | 6 | 7 | 6 | 5 | 7 | 5 | 5 |
| FS (kg/cm$^2$) | 950 | 960 | 900 | 920 | 910 | 920 | 910 | 860 | 880 | 990 | 970 | 1100 | 1200 |
| FM (kg/cm$^2$) | 44100 | 45100 | 34000 | 35000 | 36000 | 38000 | 36000 | 32000 | 34000 | 49000 | 45000 | 45000 | 46000 |
| Izod (kg · cm/cm) | 3.5 | 3.5 | 3.6 | 3.5 | 3.5 | 3.5 | 3.4 | 3.7 | 3.4 | 3.3 | 3.6 | 3.5 | 3.7 |
| Repeated impact strength (number) | 1200 | 1100 | 2000 | 1900 | 1700 | 1200 | 900 | 500 | 900 | 500 | 1000 | 1200 | 1100 |
| Molding strain | ○ | ○ | ⊚ | ⊚ | ⊚ | ⊚ | ○ | ⊚ | X | XX | ○ | ○ | ○ |
| Meshing error of both tooth flanks (mm) | 0.025 | 0.029 | 0.015 | 0.018 | 0.023 | 0.040 | 0.030 | 0.015 | 0.055 | 0.085 | — | — | — |
| Resistance to Friction & Weaving | | | | | | | | | | | | | |
| Stainless steel | | | | | | | | | | | | | |
| Friction coefficient ($\mu$) | 0.11 | 0.15 | 0.15 | 0.16 | 0.18 | 0.28 | 0.48 | 0.48 | 0.14 | 0.18 | 0.10 | 0.70 | 0.71 |
| Abrasion wear ($\mu$m) | 5 | 5 | 5 | 6 | 8 | 30 | 120 | 150 | 18 | 28 | 4 | 290 | 340 |
| Polyoxymethylene resin | | | | | | | | | | | | | |
| Friction coefficient ($\mu$) | 0.12 | 0.12 | 0.21 | 0.21 | 0.22 | 0.35 | 0.47 | 0.58 | 0.20 | 0.20 | 0.51 | 0.45 | 0.68 |
| Abrasion wear ($\mu$m) | 19 | 18 | 35 | 36 | 40 | 78 | 140 | 190 | 73 | 40 | 130 | 110 | 230 |
| Own material | | | | | | | | | | | | | |
| Friction coefficient ($\mu$) | 0.16 | 0.15 | 0.16 | 0.17 | 0.19 | 0.32 | 0.30 | 0.35 | 0.16 | 0.16 | 0.74 | 0.58 | 0.75 |
| Abrasion wear ($\mu$m) | 23 | 21 | 32 | 40 | 41 | 74 | 98 | 130 | 74 | 33 | 230 | 190 | 280 |

TABLE 2

|  | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|
| Composition |  |  |  |  |  |  |  |  |  |  |  |  |  |  |
| Polyoxymethylene resin (A-1) | 80 | 80 | 80 | 80 | 80 | 80 | 80 | 80 | 80 | 80 | 80 | 80 | 80 | 80 |
| Wollastonite, etc. |  |  |  |  |  |  |  |  |  |  |  |  |  |  |
| (B-1) | 20 | 20 | 20 | 20 | 20 | 20 | 20 | 20 |  |  |  |  | 10 | 15 |
| (B-3) |  |  |  |  |  |  |  |  | 20 | 20 | 20 | 20 | 10 | 5 |
| Aliphatic ester, etc. |  |  |  |  |  |  |  |  |  |  |  |  |  |  |
| (C-1) | 2 | 2 | 2 | 2 | 2 | 2 | 2 | 2 |  |  |  |  | 2 | 2 |
| (C-2) |  |  |  |  |  |  |  |  | 2 |  |  |  |  |  |
| (C-3) |  |  |  |  |  |  |  |  |  | 2 |  |  |  |  |
| (C-4) |  |  |  |  |  |  |  |  |  |  | 2 |  |  |  |
| (C-5) |  |  |  |  |  |  |  |  |  |  |  | 2 |  |  |
| Polyolefin resin |  |  |  |  |  |  |  |  |  |  |  |  |  |  |
| (D-1) |  |  |  |  |  |  |  |  | 2 | 2 | 2 | 2 | 2 | 2 |
| (D-2) | 2 |  |  |  |  |  |  |  |  |  |  |  |  |  |
| (D-3) |  | 2 |  |  |  |  |  |  |  |  |  |  |  |  |
| (D-4) |  |  | 2 |  |  |  |  |  |  |  |  |  |  |  |
| (D-5) |  |  |  | 2 |  |  |  |  |  |  |  |  |  |  |
| (D-6) |  |  |  |  | 2 |  |  |  |  |  |  |  |  |  |
| (D-7) |  |  |  |  |  | 2 |  |  |  |  |  |  |  |  |
| (D-8) |  |  |  |  |  |  | 2 |  |  |  |  |  |  |  |
| (D-9) |  |  |  |  |  |  |  | 2 |  |  |  |  |  |  |
| Result |  |  |  |  |  |  |  |  |  |  |  |  |  |  |
| Pysical Property |  |  |  |  |  |  |  |  |  |  |  |  |  |  |
| MI (g/10 min) | 24 | 25 | 24 | 24 | 25 | 26 | 26 | 24 | 24 | 25 | 28 | 28 | 25 | 25 |
| TS (kg/cm$^2$) | 540 | 530 | 540 | 540 | 550 | 540 | 540 | 540 | 520 | 520 | 500 | 500 | 530 | 540 |
| TE (%) | 7 | 6 | 6 | 6 | 6 | 7 | 6 | 6 | 7 | 7 | 8 | 8 | 7 | 6 |
| FS (kg/cm$^2$) | 950 | 960 | 970 | 970 | 960 | 970 | 960 | 960 | 900 | 900 | 880 | 890 | 940 | 950 |
| FM (kg/cm$^2$) | 44000 | 44000 | 44000 | 45000 | 45000 | 44000 | 45000 | 44000 | 34000 | 34000 | 33000 | 33000 | 40000 | 43000 |
| Izod (kg·cm/cm) | 3.5 | 3.4 | 3.5 | 3.4 | 3.6 | 3.5 | 3.5 | 3.2 | 3.5 | 3.5 | 3.3 | 3.4 | 3.5 | 3.5 |
| Repeated impact strength (number) | 1200 | 1100 | 900 | 1200 | 800 | 1100 | 1100 | 800 | 2000 | 2000 | 2000 | 2000 | 1600 | 1300 |
| Molding strain | ○ | ○ | ○ | ○ | ○ | ○ | ○ | ○ | ◉ | ◉ | ◉ | ◉ | ◉ | ○ |
| Meshing error of both tooth flanks (mm) | 0.025 | 0.025 | 0.027 | 0.025 | 0.027 | 0.023 | 0.023 | 0.025 | 0.015 | 0.015 | 0.016 | 0.014 | 0.017 | 0.020 |
| Resistance to Friction & Wearing |  |  |  |  |  |  |  |  |  |  |  |  |  |  |
| Stainless steel |  |  |  |  |  |  |  |  |  |  |  |  |  |  |
| Friction coefficient ($\mu$) | 0.11 | 0.12 | 0.14 | 0.12 | 0.14 | 0.12 | 0.12 | 0.20 | 0.16 | 0.15 | 0.19 | 0.18 | 0.15 | 0.13 |
| Abrasion wear ($\mu$m) | 6 | 6 | 12 | 6 | 14 | 6 | 8 | 26 | 8 | 7 | 13 | 15 | 5 | 5 |
| Polyoxymethylene resin |  |  |  |  |  |  |  |  |  |  |  |  |  |  |
| Friction coefficient ($\mu$) | 0.12 | 0.12 | 0.26 | 0.12 | 0.28 | 0.14 | 0.14 | 0.33 | 0.20 | 0.18 | 0.19 | 0.25 | 0.16 | 0.14 |
| Abrasion wear ($\mu$m) | 20 | 26 | 42 | 22 | 50 | 26 | 25 | 67 | 30 | 28 | 33 | 44 | 25 | 20 |
| Own material |  |  |  |  |  |  |  |  |  |  |  |  |  |  |
| Friction coefficient ($\mu$) | 0.16 | 0.16 | 0.20 | 0.15 | 0.19 | 0.20 | 0.18 | 0.30 | 0.17 | 0.19 | 0.22 | 0.20 | 0.16 | 0.16 |
| Abrasion wear ($\mu$m) | 25 | 25 | 42 | 25 | 51 | 27 | 30 | 70 | 32 | 35 | 45 | 45 | 27 | 21 |

TABLE 3

|  | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|---|
| Composition |  |  |  |  |  |  |  |  |  |  |  |  |
| Polyoxymethylene resin |  |  |  |  |  |  |  |  |  |  |  |  |
| (A-1) |  |  |  |  |  |  |  |  |  |  | 80 | 80 |
| (A-2) | 80 | 80 | 80 | 80 | 80 |  |  | 40 | 40 | 40 |  |  |
| (A-3) |  |  |  |  |  | 80 | 80 | 40 | 40 | 40 |  |  |
| Wollastonite, etc. |  |  |  |  |  |  |  |  |  |  |  |  |
| (B-1) | 20 | 20 | 20 |  |  | 20 |  | 20 |  | 15 | 20 |  |
| (B-3) |  |  |  | 20 | 20 |  | 20 |  | 20 | 5 |  | 20 |
| Aliphatic ester, etc. |  |  |  |  |  |  |  |  |  |  |  |  |
| (C-1) | 2 |  |  | 2 |  | 2 | 2 | 2 | 2 | 2 | 2 | 2 |
| (C-3) |  | 2 |  |  | 2 |  |  |  |  |  |  |  |
| (C-5) |  |  | 2 |  |  |  |  |  |  |  |  |  |
| (C-6) |  |  |  |  |  |  |  | 3 | 3 | 3 |  |  |
| Polyolefin resin (D-2) | 2 | 2 | 2 | 2 | 2 | 2 | 2 | 2 | 2 | 2 | 2 | 2 |
| Result |  |  |  |  |  |  |  |  |  |  |  |  |
| Physical Property |  |  |  |  |  |  |  |  |  |  |  |  |
| MI (g/10 min) | 24 | 25 | 25 | 25 | 25 | 27 | 27 | 28 | 29 | 28 | 26 | 27 |
| TS (kg/cm$^2$) | 600 | 610 | 590 | 570 | 560 | 510 | 510 | 560 | 530 | 550 | 610 | 540 |
| TE (%) | 6 | 6 | 6 | 6 | 6 | 6 | 7 | 6 | 6 | 6 | 5 | 6 |
| FS (kg/cm$^2$) | 1040 | 960 | 1030 | 980 | 990 | 920 | 910 | 970 | 940 | 950 | 1050 | 890 |
| FM (kg/cm$^2$) | 50000 | 50000 | 49000 | 38000 | 38000 | 44000 | 45000 | 46000 | 37000 | 43000 | 51000 | 40000 |
| Izod (kg · cm/cm) | 3.6 | 3.5 | 3.4 | 3.6 | 3.5 | 3.5 | 3.5 | 3.5 | 3.6 | 3.5 | 3.5 | 3.4 |
| Repeated impact strength (number) | 1100 | 1100 | 1100 | 2100 | 2000 | 1100 | 1100 | 1100 | 2000 | 1300 | 1200 | 2100 |
| Molding strain | ○ | ○ | ○ | ⊚ | ⊚ | ○ | ⊚ | ○ | ⊚ | ⊚ | ○ | ⊚ |
| Meshing error of both tooth flanks (mm) | 0.026 | 0.027 | 0.027 | 0.016 | 0.017 | 0.026 | 0.016 | 0.022 | 0.014 | 0.018 | 0.025 | 0.014 |
| Resistance to Friction & Wearing |  |  |  |  |  |  |  |  |  |  |  |  |
| Stainless steel |  |  |  |  |  |  |  |  |  |  |  |  |
| Friction coefficient ($\mu$) | 0.09 | 0.10 | 0.18 | 0.16 | 0.16 | 0.13 | 0.19 | 0.09 | 0.15 | 0.10 | 0.10 | 0.15 |
| Abrasion wear ($\mu$m) | 5 | 6 | 10 | 8 | 10 | 8 | 13 | 5 | 6 | 5 | 4 | 5 |
| Polyoxymethylene resin |  |  |  |  |  |  |  |  |  |  |  |  |
| Friction coefficient ($\mu$) | 0.14 | 0.15 | 0.19 | 0.20 | 0.21 | 0.11 | 0.18 | 0.11 | 0.15 | 0.13 | 0.11 | 0.20 |
| Abrasion wear ($\mu$m) | 25 | 26 | 25 | 33 | 38 | 17 | 28 | 18 | 20 | 16 | 15 | 30 |
| Own material |  |  |  |  |  |  |  |  |  |  |  |  |
| Friction coefficient ($\mu$) | 0.16 | 0.18 | 0.19 | 0.18 | 0.19 | 0.15 | 0.16 | 0.13 | 0.15 | 0.14 | 0.15 | 0.16 |
| Abrasion wear ($\mu$m) | 20 | 24 | 30 | 30 | 35 | 24 | 28 | 15 | 20 | 15 | 18 | 25 |

TABLE 4

|  | Ex. 32 | Ex. 33 | Ex. 34 | Ex. 35 | Ex. 36 |
|---|---|---|---|---|---|
| Composition |  |  |  |  |  |
| Polyoxymethylene resin (A-4) | 90 | 80 | 70 | 80 | 70 |
| Wollastonite, etc. |  |  |  |  |  |
| (B-1) | 10 | 20 | 30 |  |  |
| (B-3) |  |  |  | 20 | 30 |
| Aliphatic ester, etc. |  |  |  |  |  |
| (C-1) | 2 | 2 | 2 |  |  |
| (C-3) |  |  |  | 2 | 2 |
| Polyolefin resin (D-1) | 2 | 2 | 3 | 2 | 2 |
| Result |  |  |  |  |  |
| Physical Property |  |  |  |  |  |
| MI (g/10 min) | 24 | 20 | 15 | 25 | 17 |
| TS (kg/cm$^2$) | 590 | 680 | 780 | 530 | 590 |
| TE (%) | 6 | 5 | 4 | 6 | 5 |
| FS (kg/cm$^2$) | 1040 | 1200 | 1400 | 940 | 1010 |
| FM (kg/cm$^2$) | 44000 | 63000 | 82000 | 38500 | 45000 |
| Izod (kg · cm/cm) | 3.6 | 3.5 | 3.4 | 3.5 | 3.2 |
| Repeated impact strength (number) | 1400 | 1200 | 1000 | 2100 | 1500 |
| Molding strain | ○ | ○ | ○ | ⊚ | ⊚ |
| Meshing error of both tooth flanks (mm) | 0.018 | 0.026 | 0.029 | 0.015 | 0.017 |
| Resistance to Friction & Wearing |  |  |  |  |  |
| Stainless steel |  |  |  |  |  |
| Friction coefficient ($\mu$) | 0.09 | 0.09 | 0.05 | 0.13 | 0.10 |
| Abrasion wear ($\mu$m) | 5 | 3 | 2 | 6 | 5 |
| Polyoxymethylene resin |  |  |  |  |  |
| Friction coefficient ($\mu$) | 0.14 | 0.11 | 0.10 | 0.19 | 0.15 |
| Abrasion wear ($\mu$m) | 25 | 12 | 10 | 25 | 20 |
| Own material |  |  |  |  |  |
| Friction coefficient ($\mu$) | 0.16 | 0.15 | 0.12 | 0.17 | 0.16 |
| Abrasion wear ($\mu$m) | 20 | 15 | 10 | 18 | 20 |

INDUSTRIAL APPLICABILITY

The polyoxymethylene resin composition of the present invention provides a molded product which is excellent in resistance to friction and wearing, has high stiffness, repeated impact strength, and small molding strain, and is excellent in gear precision as compared with conventional compositions. Therefore, the polyoxymethylene resin composition of the present invention can be provided as a new material for electrical and electronic parts, down-sizing of which has been progressing.

For example, the polyoxymethylene resin composition of the present invention can be used for parts of office automation apparatuses represented by a printer and a copying machine; for parts of video apparatuses represented by a VTR and a video movie (a video camera); for parts of apparatuses for music, image, or information represented by a cassette player, an LD, an MD, a CD (including CD-ROM, CD-R and CD-RW), a DVD (including DVD-ROM, DVD-R, DVD-RAM and DVD-Audio), a navigation system and a mobile personal computer; for parts of telecommunication apparatuses represented by a cellular phone and a facsimile machine; for an interior or exterior working part of an automobile; and for parts of industrial miscellaneous goods represented by a disposable camera, a toy, a fastener, a conveyor, a buckle and an apparatus for house-building.

As the above-listed parts of various apparatuses, there can be specifically exemplified working parts such as a gear, a cam, a slider, a lever, an arm, a clutch, a joint,. an axis, a bearing, a key-stem and a key-top, outsert resinous parts for a chassis, a chassis, a tray, a side plate, and the like.

What is claimed is:

1. A polyoxymethylene resin composition comprising:
   (A) 50 to 99 parts by weight of a polyoxymethylene resin;
   (B) 1 to 50 parts by weight of a wollastonite having a volume-average particle diameter of 0.5 to 40 μm;
   (C) 0.1 to 10 parts by weight of at least one member selected from the group consisting of an ester of an alcohol and a fatty acid, an ester of an alcohol and a dicarboxylic acid, and a compound of a polyoxyalkylene glycol based on 100 parts by weight of the total amount of Component (A) and Component (B); and
   (D) 0.1 to 10 parts by weight of a polyolefin resin based on 100 parts by weight of the total amount of Component (A) and Component (B):
      wherein when Component (C) is an ester of alcohol and a dicarboxylic acid, the alcohol is a saturated or unsaturated primary alcohol selected from the group consisting of at least one of octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol and decylstearyl alcohol.

2. A polyoxymethylene resin composition. according to claim 1, wherein the shape of the wollastonite of Component (B) is at least one member selected from the group consisting of a granular shape and a needle-like shape.

3. A polyoxymethylene resin composition according to claim 1 or 2, wherein the ester of an alcohol and a fatty acid of Component (C) is an ester of an alcohol and a fatty acid having independently a carbon number of not less than 10, the ester of an alcohol and a dicarboxylic acid of Component (C) is an ester of an alcohol and a dicarboxylic acid, each having independently not less than 10 carbon atoms, and the compound of a polyoxyalkylene glycol of Component (C) is at least one member selected from the group consisting of (1) at least one member selected from the group consisting of a polyethylene glycol, a polypropylene and a block copolymer of a polyethylene glycol and a polypropylene glycol which independently have the polymerization degree of 5 to 1,000, (2) an etherified compound of the compound described in (1) and an aliphatic compound, and (3) an esterified compound of the compound described in (1) and a higher fatty acid.

4. A polyoxymethylene resin composition according to claim 1, wherein the polyolefin resin of Component (D) is at least one member selected from the group consisting of a homopolymer or a copolymer of an unsaturated olefinic compound as represented by the general formula (1) as described below, or a modified product thereof:

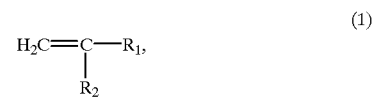

wherein $R_1$ represents a hydrogen atom or a methyl group; and $R_2$ represents a hydrogen atom, an alkyl group or a carboxyl group having 1 to 10 carbon atoms, an alkylated carboxyl group having 2 to 5 carbon atoms, an acyloxyl group having 2 to 5 carbon atoms, or a vinyl group.

5. A polyoxymethylene resin composition according to claim 1, wherein the polyolefin resin of Component (D) is at least one member selected from the group consisting of a high-pressure low-density polyethylene, a linear low-density polyethylene, an ultra-low-density polyethylene, an ethylene-propylene copolymer, and an ethylene-butene copolymer, and the weight-average molecular weight thereof is in the range of 10,000 to 300,000.

6. A polyoxymethylene resin composition according to claim 5, wherein the polyolefin resin of Component (D) has a weight-average molecular weight in the range of 10,000 to 100,000.

7. A molded product obtainable by molding the polyoxymethylene resin composition according to claim 1.

8. At least one part selected from the group consisting of a working part, an outsert resinous part for a chassis, a chassis, a tray, and a side plate, which are obtained by molding, cutting, or molding and cutting the polyoxymethylene resin composition according to claim 1.

9. A part according to claim 8, wherein the working part is at least one part selected from the group consisting of a gear, a cam, a slider, a lever, an arm, a clutch, a joint, an axis, a bearing, a key-stem, and a key-top.

10. A part according to claim 8 or 9, which is used for office automation apparatuses represented by a printer, and a copying machine.

11. A part according to claim 8 or 9, which is used for video apparatuses represented by a video tape recorder, and a video movie (a video camera).

12. A part according to claim 8 or 9, which is used for apparatuses for music, for image, or for information represented by a cassette player, a laser disc, a mini disc, a compact disc (including CD-ROM, CD-R and CD-RW), digital video disc (including DVD-ROM, DVD-R, DVD-RAM and DVD-Audio), a navigation system, and a mobile personal computer.

13. A part according to claim 8 or 9, which is used for telecommunication apparatuses represented by a cellular phone, and a facsimile machine.

14. A part according to claim 8 or 9, which is used for an interior or exterior working part for an automobile.

15. A part according to claim 8 or 9, which is used for industrial miscellaneous goods represented by a disposable camera, a toy, a fastener, a conveyor, a buckle, and an apparatus for house-building.

16. A polyoxymethylene resin composition according to claim 1, wherein the wollastonite of Component (B) has a volume-average particle diameter of 1–30 μm.

17. A polyoxymethylene resin composition according to claim 1, wherein the wollastonite of Component (B) is added in an amount of 2 to 40 parts by weight based upon 100 parts by weight of Component (A) and Component (B).

18. A polyoxymethylene resin composition according to claim 1, wherein the wollastonite of Component (B) has a volume-average particle diameter of 1–30 μm, and is added in an amount of 2 to 40 parts by weight based upon 100 parts by weight of Component (A) and Component (B).

\* \* \* \* \*